United States Patent [19]

Doerer et al.

[11] 4,296,053
[45] Oct. 20, 1981

[54] METHOD OF MAKING FOAMED PLASTISOL INSOLES FOR SHOES

[75] Inventors: Daniel M. Doerer, Chesterfield; Lloyd E. Brunkhorst, Florissant, both of Mo.

[73] Assignee: Brown Group, Inc., St. Louis, Mo.

[21] Appl. No.: 42,197

[22] Filed: May 24, 1979

[51] Int. Cl.³ .......................................... B29D 27/04
[52] U.S. Cl. ....................................... 264/26; 36/44; 264/45.5; 264/46.4; 264/46.7; 264/54; 264/DIG. 60
[58] Field of Search ................... 264/46.6, 45.3, 54, 264/26, 46.4, 45.5, 46.7, DIG. 60; 36/44; 249/121

[56] References Cited

U.S. PATENT DOCUMENTS

| | | | |
|---|---|---|---|
| 2,695,427 | 11/1954 | Sarge et al. | 264/26 |
| 2,744,340 | 5/1956 | Gerber | 264/46.6 X |
| 2,966,469 | 12/1960 | Smythe et al. | 264/26 |
| 2,974,373 | 3/1961 | Streed et al. | 264/46.6 |
| 3,002,230 | 10/1961 | Stewart | 264/46.6 |
| 3,345,439 | 10/1967 | Everard et al. | 264/26 |
| 3,446,880 | 5/1969 | Enicks | 264/46.6 |
| 3,493,449 | 2/1970 | Krug | 264/54 X |
| 3,640,913 | 2/1972 | Cerra | 264/26 X |
| 3,658,971 | 4/1972 | Schickedanz | 264/45.5 X |
| 3,773,875 | 11/1973 | Lammers | 249/121 X |
| 3,844,523 | 10/1974 | Wilheim | 264/45.5 X |
| 3,976,731 | 8/1976 | Kapral | 264/46.4 |
| 4,035,458 | 7/1977 | Lyman | 264/46.4 |
| 4,130,614 | 12/1978 | Saidla | 264/45.3 X |
| 4,134,942 | 1/1979 | Mirr et al. | 264/26 |

OTHER PUBLICATIONS

Whittington, Lloyd R., "Whittington's Dictionary of Plastics," Stamford, Conn. Technomic, ©1968, Preface, pp. 59–60.

Primary Examiner—Philip Anderson
Attorney, Agent, or Firm—Gravely, Lieder & Woodruff

[57] ABSTRACT

A process for preparing an innersole for footwear by means of molding and curing. The molding and curing is conducted under pressure in a silicone rubber mold by means of electromagnetic radiation. By means of this process, a composite board is fused to a polymeric base to form the innersole.

8 Claims, 3 Drawing Figures

METHOD OF MAKING FOAMED PLASTISOL INSOLES FOR SHOES

BACKGROUND OF THE INVENTION

It is well known that plastic compositions may be molded and cast by certain well known techniques in which the end product can be either soft or spongy, flexible or possessing certain degrees of rigidity in order to meet the necessary objectives in the use of such material.

In the art of shoe making, it has been known to make insoles for footwear by building up a composite made up of a number of different plies. Heretofore insoles have been made by layering a ply of board or composition material, a ply of fairly firm but flexible cushioning material, and a ply of leather or plastic material to impart a final surface appearance of a desired characteristic. In making up an insole from a multi-ply composition, it has been the practice to die cut each one of the plies separately, relate them in a stacked position with the use of a suitable adhesive, and to last the leather or plastic ply to the cushion and the board plies so that the leather or plastic ply encases the other plies in the final construction of the insole.

Such prior techniques are expensive because it requires many separate operations and a great deal of manual labor in die cutting the separate plies, assembling the plies in proper order, and performing the necessary lasting operation to produce the final insole.

SUMMARY OF THE INVENTION

This invention relates to a process for molding footwear insoles, and to production of insoles by an improved molding process.

More specifically, this invention relates to the process of uniting two plies making up an insole for footwear by molding the plies together so that the final product is formed without the need for manual manipulation as has been the practice heretofore.

An important object of the present invention is to produce a molded insole for footwear by a unique and simple process so as to avoid the more expensive ways of producing insoles for footwear.

It is a further important object of the present invention to provide a molding process for footwear insoles.

The present invention is commercially practiced by providing a low polarity material which provides the molding cavities, utilizing a polymeric material as the principal material of the insole, and uniting the polymeric material with a stabilizing composite ply which is integrally molded in place, and subjecting the polymeric material to a high-energy radio frequency AC field which effects reversals in the molecules of the polymeric material sufficiently to develop kinetic energy in the form of heat for initiating and carrying out the decomposition of a blowing agent which expands the polymeric material to form the desired cushion, and fuses the polymeric material to the composite ply.

DETAILED DESCRIPTION OF THE DRAWINGS

The present invention is illustrated in the accompanying drawings, wherein.

DETAILED DESCRIPTION OF THE INVENTION

The materials making up the insole for footwear include a polymer and a board or composition ply which is initially molded into the polymer, and after molding, a polyurethane finish or skin covering the polymer in order to lessen the normal coefficient of friction and to produce a desired surface treatment.

It is preferred in the practice of this invention to employ a vinyl plastisol material which is pourable at room temperature and has a fluid characteristic to permit it to spread evenly in a mold cavity. The vinyl plastisol uses a plasticizer, such as dioctyl phthalate, and a desired small amount of a chemical blowing agent is included. A suitable blowing agent is benzene sulfonyl hydrazide.

The board or composition material may be any of those normally used in the manufacture of shoes, and one in particular may be a composition board sold under the trademark Texon which is produced by Texon, Inc. This is an impregnated fiber material and is commonly used in the construction of footwear.

Figure 1:
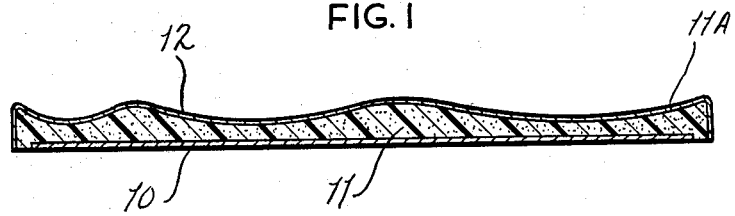
FIG. 1 is a longitudinal sectional elevation through an insole illustrating the elements making up the final product.

As was pointed out above the molded vinyl plastisol and composite board, after molding, are given a spray finish such as polyurethane which lessens the coefficient of friction of the surface of the insole. The finished insole product is illustrated in FIG. 1, in sectional elevation. It is seen to include the board or composition material 10, the foamed vinyl plastisol cushion ply 11 with integral skin 11A and the polyurethane spray finish or skin 12.

Figure 2:
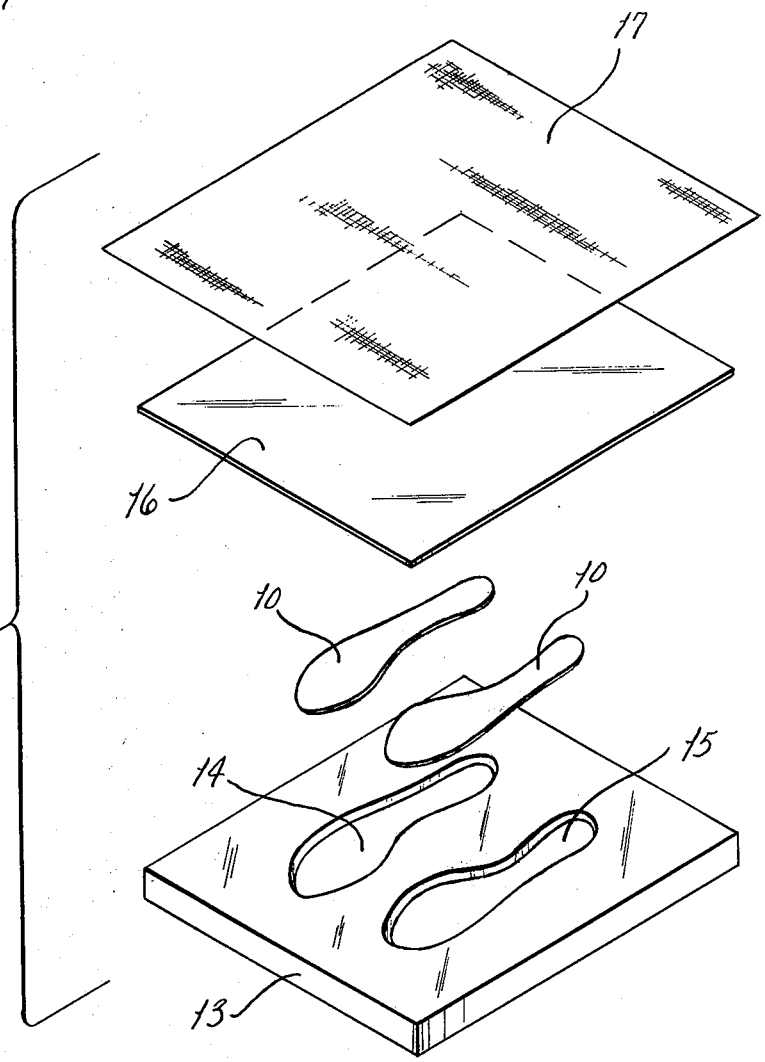
FIG. 2 is an exploded perspective view of the mold and its supporting components for producing the footwear insole of this invention.
Figure 3:
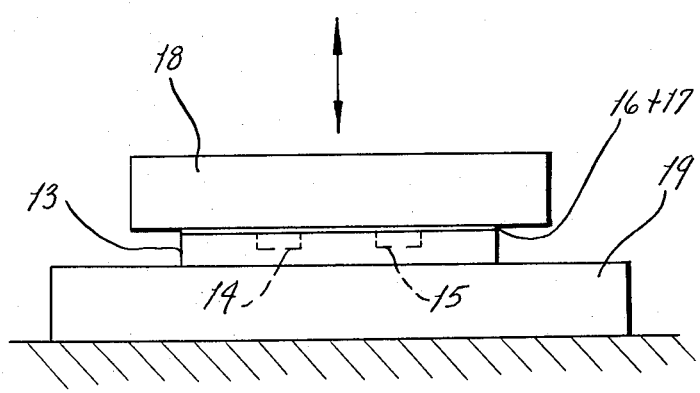
FIG. 3 is an elevation view of the molding apparatus in position to carry out the molding process.

The process of making the insole product is illustrated in FIGS. 2 and 3. In FIG. 2 the basic mold 13 is formed of a low polarity silicone rubber formed with a plurality of molding cavities such as the left foot cavity 14 and the right foot cavity 15. It is of course understood that the silicone rubber mold may be made with many pairs of mold cavities, but for the present disclosure a single pair of cavities has been selected.

The properly prepared vinyl plastisol material in a fluid state at room temperature is poured into the cavity 14 and 15 in an amount equal to approximately 67% of the volume of these cavities. The pouring apparatus may be any suitable dispenser which has been preset to discharge the required amount up to approximately 67% of the cavity volume. After the vinyl has been deposited in the mold cavity, the board or composition ply 10 is floated on the surface of the vinyl plastisol. By preference, these plies 10 are approximately one size smaller than the size of the cavities 14 and 15 so that during the final molding process the boards 10 are firmly embedded in the cushion material 11, thereby sealing the edges to moisture exposure. The composition plies 10 occupy approximately 20% of the volume of the mold cavities 14 and 15.

Having loaded each of the mold cavities 14 and 15 in the manner above described, a release paper ply 16 is laid over the mold 13 in position so that its surface adjacent the mold 13 presents porosity for the eventual escape of the air and nitrogen gas in the blowing agent during the heating of the mold. It should be remembered that approximately 13% of the mold cavity volume is air at the beginning of the molding process, and that upon the completion of the molding process the vinyl plastisol has been expanded to form the desired cushion up to substantially the full volume of the cavities 14 and 15. After the release paper 16 is properly positioned, a venting screen ply 17 is laid over the ply 16. This screen is composed of woven fibers which provide spaces between the fibers to create a reservoir for the air and gas passing through the release paper 16. The venting screen should be sufficiently large so that its margins extend beyond the margins of the release paper ply 16 for the purpose of creating minute passages between the interstices of the woven ply 17. Thus air and gas may be vented to the exterior along the monofilaments when the reservoir volume has been used up.

A pressure head 18 is then brought down on top of the silicone rubber mold 13 so as to exert a pressure upon the mold 13 supported on a rigid table 19. The pressure head 18 applies a pressure on the mold 13 of the order of from 2500 to 4000 psi. The pressure to be exerted should be an amount necessary to overcome the internal pressure generated by the blowing agent, and to prevent flash forming around the margins of the mold cavities 14 and 15. Excessive pressure should be avoided because it will result in mold distortion and instability in the desired dimensions of the part produced in the mold cavities. It has been found that a nominal pressure of 2500 psi of mold area is satisfactory to avoid mold distortion and to avoid excessive flash formation. Excessive flash formation requires a manual trimming operation, and that is to be avoided.

The pressure plate 18 is equipped with radio frequency (RF) generating means (not shown) in the high frequency (HF) range of 27 to 30 mega hertz. The purpose of the high frequency is to generate a rapidly reversing AC field which very rapidly oscillates the molecules in the polar vinyl plastisol material, since the molecules try to maintain polarity relationship with the rapidly reversing field. The reversals may be of the order of 30,000,000 reversals per second which generates sufficient kinetic energy in the form of heat to initiate the gelling of the vinyl plastisol, and at the same time raise the temperature of the blowing agent to its decomposition range of about 158 to 160° C. At the decomposition temperature the blowing agent releases its nitrogen gas, and temperature increases toward the vinyl fusing point causing the gaseous nitrogen to expand and form a microcellular structure within the vinyl. During the expansion of the nitrogen gas, the air that occupied approximately 13% of the cavity volume is vented through the release paper into the venting screen 17 and eventually a atmosphere.

The high frequency reversing AC field is maintained for a period of time which lasts for approximately 30 seconds, and then the current is shut off, either manually or by a suitable timer. However, the pressure exerted by the heat 18 is maintained as the vinyl cools down during a period of time of approximately 30 to 60 seconds. Cooling can be assisted by suitable water circulation in the head 18. High output from the molding equipment can be reached by water cooling the molding apparatus, otherwise several minutes would be consumed if cooling were allowed to progress at room temperature conditions.

After the cooling cycle has run its course, the pressure head 18 is raised so that the venting screen 17 and release paper 16 may be removed, thereby exposing the molded insole elements which can then be lifted out of the cavities 14 and 15 and surface sprayed with a suitable polyurethane film to form the surface skin 12 having the characteristic of furnishing a lessened coefficient of friction and a surface gloss to the final product.

The surface characteristic at the skin 12 may be given certain shape characteristics such as might be found by forming a raised portion at the instep, raised portions in the forepart to form a desired configuration for gripping by the toes during the wearing of shoes having these insoles, or decorative grain texture and/or stitching detail. The forming of the mold cavities 14 and 15 is performed by placing properly surface shaped patterns with the foot engaging shaped surface facing upwardly in a mold box (not shown). The molding table is equipped with a fence or guard around all sides so as to retain the silicone rubber material when it is poured into the box to flow over the patterns and to a desired thickness of more than the depth of the cavities. When the silicone rubber has set, it is peeled off of the table and turned over so that mold cavities are now face up and with the surface configuration of the templates visible and forming the bottom surface of the mold cavity.

Since the board or composition ply 10 must be floated on the body of the vinyl plastisol poured into the mold cavities, it must have a lower density so that it floats, and will rise as the vinyl plastisol is expanded during the heating step in the molding process. The release paper ply 16 may be a number 3300 breathable release paper obtained from Paper Corporation of the United States, and the venting screen ply 17 can be Precap Mono-Screen ASTM No. 7-40-420 produced by Tetko, Inc.

The preferred process employs silicone rubber material for the mold 13 because it does not heat up during the application of the reversing AC field. The heat that is picked up by the mold 13 will be because of its physical contact with the vinyl plastisol material during its molding stage.

The foregoing description has been directed to a preferred process for manufacturing insoles for footwear in which the various components or plies are molded into a unit having the desired shape and surface configurations previously imparted to the cavities 14 and 15 in the mold 13. It will be understood that the shape and surface configuration of the cavities from which the insoles are produced may vary in accordance with prevailing shoe manufacturing techniques, styling, and other criteria.

What is claimed is:

1. A process for molding insoles for footwear comprising: forming a mold cavity having a predetermined shape and surface texture; metering and depositing a foamable liquid vinyl material into the mold cavity; freely floating a stabilizing ply on the liquid vinyl material in the mold cavity; closing the mold cavity with a pressure applying head; placing gas release means between the foamable liquid vinyl material in the cavity and the head to release gaseous media and to prevent adhesion of the vinyl material to the head; applying a high frequency reversing AC field for agitating the foamable liquid vinyl material into fusing and expanding to fill the mold cavity; and providing a reservoir for air and gas passing through the release means such that the mold cavity is vented during the agitating of the foamable liquid vinyl material.

2. A process for making insoles for footwear comprising the steps of: pouring polar vinyl plastisol pourable at room temperature, and containing a chemical blowing agent, into a mold cavity; floating a composition material ply on the plastisol; positioning a gas release and plastisol restraint means between parts of the mold cavity; subjecting the plastisol to a rapidly reversing AC field of radiation to expand and fuse the vinyl plastisol into a cellular cushion substantially filling the mold cavity and incorporating the ply therein; and simultaneously restraining the foaming plastisol in the mold cavity while venting the mold cavity.

3. The process of claim 2, wherein the mold is made of low polarity silicone rubber.

4. The process of claim 2, wherein the AC field of radiation is employed for about 30 seconds and possesses high frequency in the range of about 27 to about 30 mega hertz.

5. The process of claim 2, wherein the mold cavity is filled to about 67% of capacity with plastisol prior to subjection to radiation.

6. The process of claim 2, wherein the mold cavity is formed in two pieces and one part is covered with release paper adjacent to the plastisol and a venting screen is positioned over the release paper to prevent the cured vinyl plastisol from containing gas entrapment voids, while still restraining the foaming plastisol within the mold cavity.

7. The process of claim 6, wherein the mold cavity is closed and held closed at a pressure of the order to prevent flashing.

8. A process for molding insoles for footwear comprising the steps of placing a fluid polar vinyl plastisol pourable at room temperature and containing a chemical blowing agent into a mold cavity having an open top; floating a stabilizing ply on the surface of the fluid plastisol; placing gas release means over the open top of the mold cavity, said gas release means comprising a gas permeable paper adjacent to the plastisol and a venting screen on the surface of the paper most remote from the plastisol with the screen communicating with the exterior of the mold to provide means for venting the gas releasing during fusing and foaming of the plastisol; closing the open top of the mold cavity under sufficient pressure to overcome the internal pressure generated by the blowing agent and to prevent flash forming around the margins of the mold cavity; applying a high frequency reversing AC field to the plastisol; fusing and foaming the plastisol to fill the mold cavity while maintaining the stabilizing ply floating on the plastisol; embedding the stabilizing ply into the top surface of the plastisol spaced from the peripheral edges; and venting the air and gas from the mold cavity through the gas release means to the exterior of the mold cavity.

* * * * *